No. 627,184. Patented June 20, 1899.
P. H. GRAVES.
ELEVATOR DUMP.
(Application filed Apr. 27, 1898.)
(No Model.)
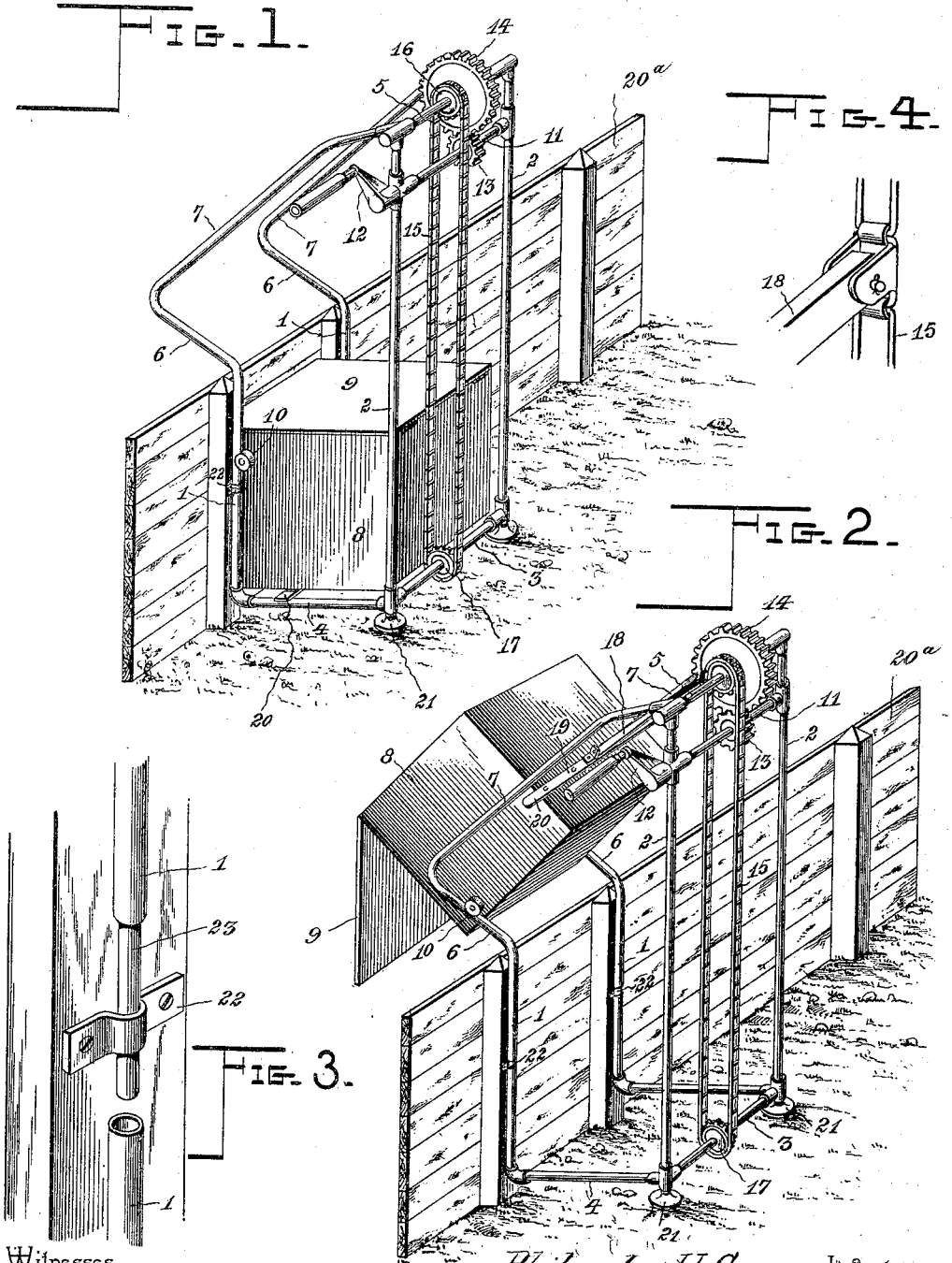
Witnesses
John F. Denferwiel
U. B. Hillyard.
Philander H. Graves, Inventor
By his Attorneys,
C. A. Snow & Co.

UNITED STATES PATENT OFFICE.

PHILANDER H. GRAVES, OF CHICAGO, ILLINOIS, ASSIGNOR TO MARION GRAVES AND CHARLES G. BIRD, OF SAME PLACE.

ELEVATOR-DUMP.

SPECIFICATION forming part of Letters Patent No. 627,184, dated June 20, 1899.

Application filed April 27, 1898. Serial No. 678,965. (No model.)

*To all whom it may concern:*

Be it known that I, PHILANDER H. GRAVES, a citizen of the United States, residing at Chicago, in the county of Cook and State of Illinois, have invented a new and useful Elevator-Dump, of which the following is a specification.

This invention has relation to apparatus for elevating and automatically dumping garbage, ashes, and other refuse matter and with slight changes can be used with hand, horse, or other power for lifting grain, garbage, ashes, and other articles, such as bales of hay, cotton, and barrels or packages of flour and the like.

While the invention is adapted for a variety of uses to facilitate the handling of commodities and any articles, it is designed most expressly for dumping garbage, coal-ashes, and refuse matter, thereby facilitating the collection of such matter and preventing the scattering thereof by the wind or by the tedious and laborious process of shoveling.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the apparatus as it appears when arranged for receiving refuse matter. Fig. 2 is a view similar to Fig. 1, showing the relation of the parts when dumping. Fig. 3 is a detail view showing the clamp and connection between it and the parts of the front uprights. Fig. 4 is a detail view showing more clearly the pivotal connection of the arm with the elevating-chain.

Corresponding and like parts are referred to in the following description and indicated in the accompanying drawings by the same reference characters.

The framework comprises front uprights 1, rear uprights 2, lower rear and side connecting-bars 3 and 4, and an upper cross-bar 5, connecting the uprights 2 at their upper ends. The frame-bars are preferably tubular, being constructed of ordinary gas-pipe, and are joined by couplings or fittings such as are commonly employed for securing lengths of pipe together at their points of branching and union. The front uprights 1, near their upper ends, incline upwardly and forwardly, as shown at 6, thence upwardly and rearwardly, as indicated at 7, and make connection with the upper ends of the uprights 2. Corresponding parts of the uprights 1 extend in parallel relation. Hence the inclined portions 6 and 7 aline transversely. The forwardly-inclined parts 6 provide for a dumping of the box or receptacle containing the matter to be disposed of, as will appear more fully hereinafter.

The box or receptacle 8 for containing the load or matter may be of any size, shape, and construction and is preferably formed from galvanized sheet-iron, which is fireprooof as against hot ashes and capable of resisting corrosive action as against wet and garbage. This box or receptacle is closed by a cover 9, hinged thereto at its rear end, so as to swing downward and outward at its free end when the box is tilted, as indicated in Fig. 2. While it is preferred to construct the receptacle of galvanized iron, it is obvious that any material may be employed in its formation. A roller 10 is located at each side of the box, near its upper forward corner, and is grooved in its periphery and adapted to travel upon the adjacent upright 1, so as to direct the box in its various movements when elevating and dumping.

The hoisting mechanism consists of a shaft 11, provided at one end with a crank 12, pulley, or like part and is journaled at its ends to the upper portion of the uprights 2, a pinion 13, secured to the shaft and meshing with a gear-wheel 14, loosely mounted upon the cross-bar 5, and a chain belt 15, supported at its upper end by means of a pinion 16, formed with or applied to a side of the gear-wheel 14, and at its lower end by means of a pinion 17, loosely mounted upon the rear cross-bar 3. An arm 18 has pivotal connection with a link of the chain belt 15 and is pivotally connected at its inner or forward end with a transverse bar 19, secured to the bottom side of the box or receptacle 8, a little in the front of a medial line, whereby the normal tendency when elevating the box is to push it forward, and which forward tendency is compensated for by the rollers 10, bearing against the uprights 1. The end portions of the transverse bar 19 project beyond the sides of the box, forming stops 20, which are adapted to engage with the side bars 4 and the corresponding upper frame-bars and limit the downward-and-upward movement of the box.

When it is required to dump the load or matter contained in the box or receptacle 8, the shaft 11 is rotated by means of the crank 12, thereby setting the chain belt 15 in motion and lifting the box. As previously stated, the normal tendency of the box is to move forward by reason of the application of the lifting force thereto in the rear of a central line. When the rollers 10 reach the inclined parts 6 of the uprights 1, they follow said deflected portions, thereby causing the upper forward portion of the box to move away from a plane passing vertically through the uprights 1. The lower rear portion of the box moves in a vertical line until it reaches the plane of the rollers 10, when a continued upward movement of the box causes the latter to tilt and discharge its contents, as will be readily understood and as clearly indicated in Fig. 2. The cover 9 opens automatically, thereby permitting free exit of the matter to be disposed of. After the load has been dumped and the crank 12 is released the box by reason of its weight will return to a normal position.

When the refuse matter is required to be lifted and discharged over a fence, as 20ª, it is placed against the same as indicated in the drawings, the uprights 1 being arranged so that their inclined parts 6 overhang the top edge of the fence, so that the receptacle when lifted discharges its contents over the fence, as shown in Fig. 2, and into a wagon, cart, or receptacle placed to receive the matter. By having the shaft 11 elevated the crank 12 can be conveniently and easily reached by the driver of the wagon or cart, thereby permitting of the box being relieved of its contents without requiring the driver to dismount for the purpose. The front uprights 1 may be secured to the fence in any convenient and substantial manner and the rear uprights are provided with feet 21 to prevent them from sinking into the ground.

The front uprights 1 are secured to the fence-post or other supporting structure by means of clamps 22 and pins or rods 23, the clamps consisting of strips of metal bent intermediate of their ends to receive the rods 23 and have their outer portion conform to the surface of the uprights, so as to come flush therewith. This construction provides an uninterrupted and smooth track or surface for the rollers 10 to travel upon. The front uprights can be readily lengthened or shortened, provision being had for such result by having the uprights formed in sections and connected by the pins or rods 23.

Having thus described the invention, what is claimed, and desired to be secured by Letters Patent, is—

1. In a lifting and dumping apparatus, the combination with framework having main and deflected portions, of a support or receptacle for containing a load and movably and tiltably carried respectively by said main and deflected portions, an elevating device, and a link connected respectively to the lifting device and to said support, the joint between the link and the support being on the under side of the latter at a point forward of a central line therethrough.

2. In a lifting and dumping apparatus, the combination of a framework comprising upper and lower side bars, and a pair of uprights having their upper portions inclined upwardly and forwardly thence upwardly and rearwardly, a support for receiving the load provided with pulleys to travel upon the uprights and the inclined parts thereof and direct the support in its vertical and tilting movements, stops at the sides of the support to engage with the upper and lower side bars of the frame and limit the vertical movements of the support, means for elevating the support, and an arm having pivotal connection with the elevating means and with the support at a point forward of the medial line, substantially as and for the purpose set forth.

3. The herein-described apparatus for elevating and dumping refuse and other matter, comprising a framework having upper and lower side bars and front uprights provided at their upper ends with upwardly and forwardly inclined parts and upwardly and rearwardly inclined portions, a box or receptacle provided near its upper front corners with rollers to travel upon the said uprights, a transverse bar applied to the bottom of the box and having its end portions extending and forming stops to engage with the upper and lower side bars and limit the movements of the box, a chain belt passing around upper and lower pinions, an elevated crank for imparting movement to the chain belt, and an arm having pivotal connection with the chain belt and with the box at a point forward of a central line, substantially as set forth.

4. In a lifting and dumping apparatus, the combination of a framework comprising sectional uprights, pins or rods inserted in the contiguous end portions of corresponding and matching sections, and clamps embracing said pins or rods at an intermediate point and serving as means for connecting the framework to a supporting structure, the opposing ends of companion sections abutting against the deflected or bent parts of the clamps and coming flush therewith, a receptacle provided with rollers to travel upon the uprights of the framework, and elevating mechanism for the receptacle, substantially as described.

In testimony that I claim the foregoing as my own I have hereto affixed my signature in the presence of two witnesses.

PHILANDER H. GRAVES.

Witnesses:
CHAS. G. BIRD,
J. C. SPRIGGS.